Nov. 27, 1951     A. U. BRYANT     2,576,747
LIQUID DISPENSER WITH MEANS TO
VARY A MEASURED DISCHARGE

Filed Jan. 24, 1946     2 SHEETS—SHEET 1

INVENTOR.
AUSTIN U. BRYANT
BY
ATTORNEY.

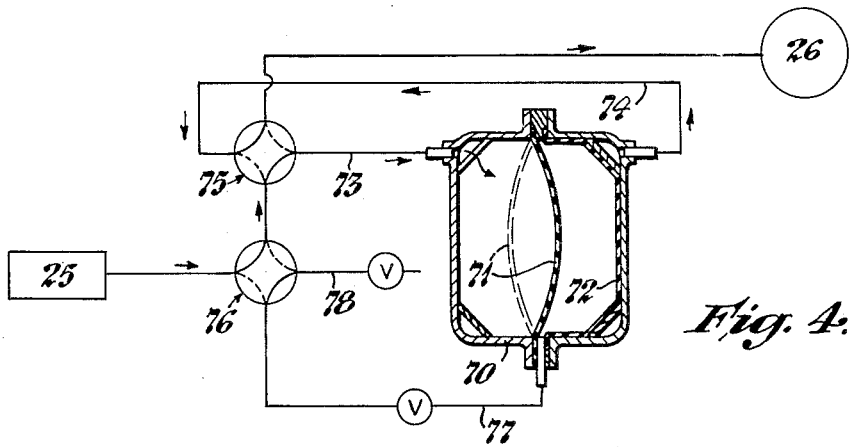
Fig. 4.
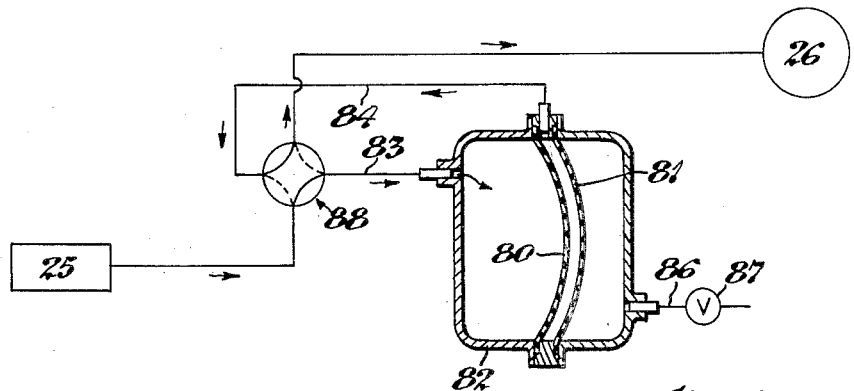
Fig. 5.
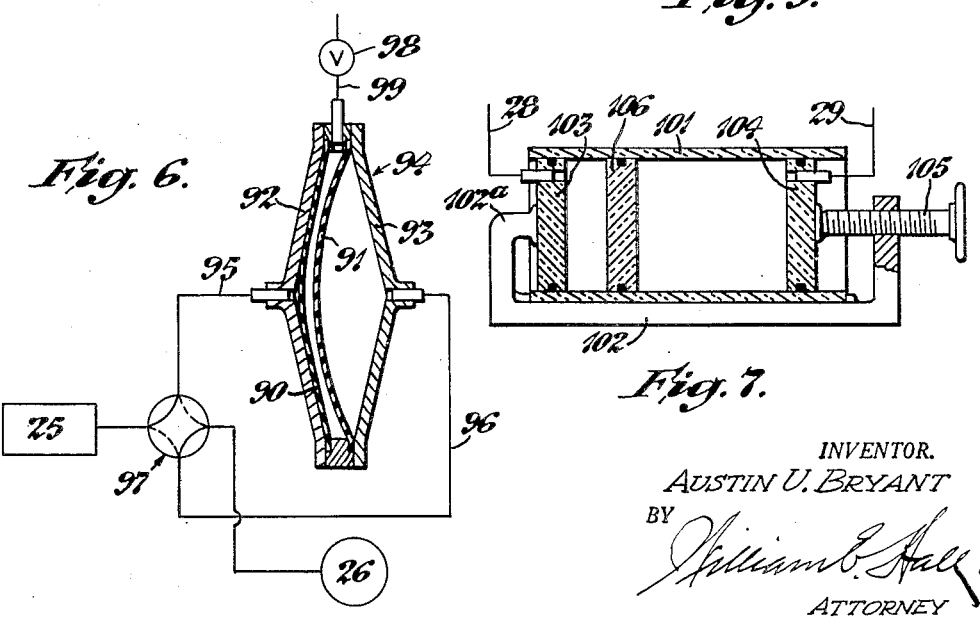
Fig. 6.
Fig. 7.
INVENTOR.
AUSTIN U. BRYANT
BY
ATTORNEY Patented Nov. 27, 1951

2,576,747

UNITED STATES PATENT OFFICE 2,576,747

LIQUID DISPENSER WITH MEANS TO VARY A MEASURED DISCHARGE

Austin U. Bryant, Berkeley, Calif.

Application January 24, 1946, Serial No. 643,036

4 Claims. (Cl. 222—250)

My invention relates to devices for dispensing liquid in measured quantities, this invention being particularly applicable to a device for metering and delivering predetermined amounts of liquid, such as metering and delivering water to a concrete mixer, beverages, and the like, in bottling machines, and for delivering other liquids to various apparatus.

One object of the invention is to provide a device for dispensing liquids in measured quantities which is extremely simple in construction, efficient in operation and one which may be readily adjusted to accurately vary the amount of liquid dispensed thereby.

Another object is to provide a device of the type indicated comprising a receptacle, septum means in the receptacle for dividing the receptacle into two chambers, ports communicating with each of the chambers, valve means for alternately connecting each of the ports to a source of liquid supply and to a point to which the liquid is to be delivered, the introduction of liquid into each of the chambers effecting relative movement between the receptacle and septum to discharge liquid alternately from each of said chambers to deliver it to the point of delivery, and means for varying the extent of relative movement between the receptacle and septum means to control the amount of liquid dispensed from the chambers.

Another object is to provide a device of the type indicated in which the septum means may consist of a piston in the receptacle and slidable therein in opposite directions under the influence of fluid pressure introduced into either of the ends of the receptacle.

Another object is to provide a device of the type indicated in which the septum means may consist of a flexible diaphragm adapted to be flexed alternately in opposite directions to force liquid alternately from the opposite ends or chambers of the receptacle.

Another object is to provide a device of the type indicated in which the septum means consists either in two spaced pistons or two spaced diaphragms and in which means are provided for introducing liquid into or discharging it from the space between the pistons or diaphragms to vary the width of the septum means and thereby alter the capacity of the chambers to control the amount of liquid dispensed from the chambers.

Another object is to provide a device of the type indicated in which a selector valve is employed for alternately connecting each of the chambers of the receptacle to a source of liquid supply and to the point to which the dispensed liquid is to be delivered.

Further objects of my invention are set forth in the following specification which describes several embodiments of the improved liquid-dispensing device, by way of example, as illustrated by the accompanying drawings.

In the drawings:

Fig. 4 is a similar view of another modified form of device utilizing a pair of flexible members as the septum means and including means for introducing liquid into and discharging it from between the flexible members to vary the quantity of liquid dispensed;

Fig. 5 is a view similar to Fig. 4, showing a dispensing device in which a pair of diaphragms are adapted to flex and in which the liquid is dispensed from one end of the receptacle and from the space between the diaphragms;

Fig. 6 is a view of a further modification of the dispensing device having a different form of receptacle; and, Fig. 7 is a diagrammatic view, similar to Fig. 1, in which the heads of the cylinder are contractable with respect to each other in order to obtain or vary the adjustment of the dispensing compartment.

Figure 1:
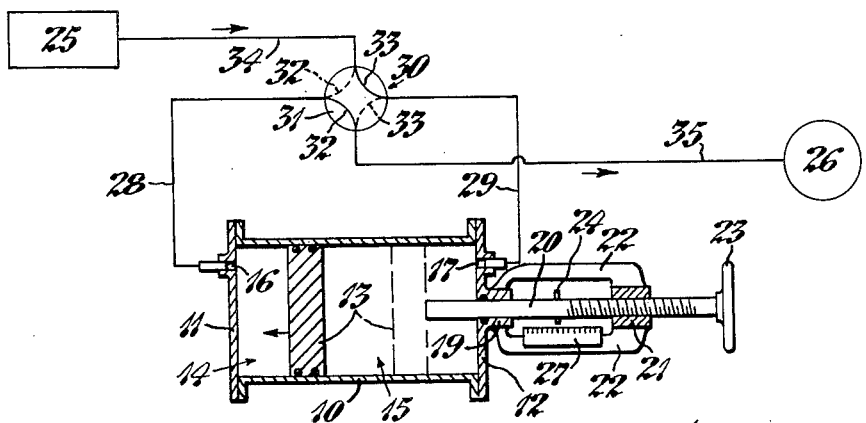
Fig. 1 is a longitudinal sectional view of a preferred embodiment of my improved liquid-dispensing device employing a single piston as the movable septum means and a manually adjusted stop for limiting sliding movement of the piston.

Referring first to Fig. 1 of the drawings, my improved liquid measuring and dispensing device comprises a receptacle 10, which may be in the form of a cylinder having removable end walls 11 and 12. Arranged for axial sliding movement in the cylindrical receptacle 10 is a movable septum member or piston 13. The member 13 divides the receptacle 10 into two chambers 14 and 15, and ports 16 and 17 in the end walls 11 and 12 communicate with the chambers 14 and 15, respectively.

The end wall 12 is provided with a bearing 19 through which an adjusting member 20 is adapted to be slid. The outer end of the member 20 is screw-threaded to adapt it to be screwed into an internally threaded outboard bearing 21 supported from the bearing 19 by arms 22, the outer extremity of the member 20 being provided with a handwheel 23. The member 20 has a pointer 24 adapted to register with the graduations of a scale 27 provided on one of the arms 22, the graduations representing quarts, gallons, or any other unit of liquid measurement. The inner end of the adjusting member 20 projects into the receptacle to serve as a stop against which the septum member 13 is adapted to abut when it is slid toward the right-hand end wall 12 as indicated by the dotted lines in Fig. 1. It will be apparent therefore that the adjusting member 20 limits the extent of sliding movement of the piston 13 in one direction and thus, in effect, varies the quantity of liquid permitted to enter and to be displaced alternately from the chambers 14 and 15.

The ports 16 and 17 are adapted to be selectively connected to a source of liquid supply, indicated at 25, or to the rotary mixing unit of a concrete mixer or other apparatus, indicated at 26. Lines 28 and 29 extend from the ports 16 and 17, respectively, to the opposite sides of a selector valve 30, which is shown diagrammatically in Fig. 1. The valve 30 may be of any desired type, and I prefer to use a four-way valve having a rotary plug 31 provided with curved ports 32 and 33. A line 34 is connected between the source of liquid supply 25 and the valve 30, while a line 35 extends from the valve to the apparatus 26.

My improved liquid measuring and dispensing device operates in the following manner: Assuming that the valve plug 31 has been rotated to a position wherein its port 32 connects the lines 28 and 35 and its port 33 connects lines 29 and 34, liquid will flow, preferably under pressure, through the port 17 into the chamber 15 to act against the piston 13 to force the latter toward the left as indicated by the arrow. Movement of the piston 13 in this direction will act to displace liquid from the chamber 14, by way of port 16, line 28, valve port 32, and line 35, to deliver said liquid to the apparatus 26. Sliding movement of the piston 13 toward the left will be limited by its engagement with the end wall 11. It will thus be seen that the amount of liquid delivered from the device will be equal to the displacement caused by the piston in the cylindrical chamber 14. When the piston 13 engages the end wall 11, further flow of liquid into the chamber 15 will cease, even though the valve 30 remains in the position to which it was adjusted. When the device is used in conjunction with a concrete mixer, for example, the volume of dispensed water is used in mixing a single batch of concrete. When the next batch is to be mixed, the valve plug 31 is turned ninety degrees so that its ports 32 and 33 are in the positions shown by dotted lines in Fig. 1. The water is thus caused to flow from the pipe 34, through the valve port 32, line 28 and port 16, into the left-hand end of the receptacle or cylinder 10 to force the movable septum or piston 13 toward the right. In this manner, the water previously inserted into the chamber 15 will be discharged therefrom and flow through the port 17, line 29, valve port 33, and line 35, to the mixer 26. The volume of water delivered to the mixer 26 may be varied in accordance with the requirements by merely turning the handwheel 23 to move the adjusting member 20 axially in either direction and thereby limit the extent of sliding movement of the piston 13 toward the right to vary the displacement caused by the piston 13 in the chambers 14 and 15.

Figure 2:
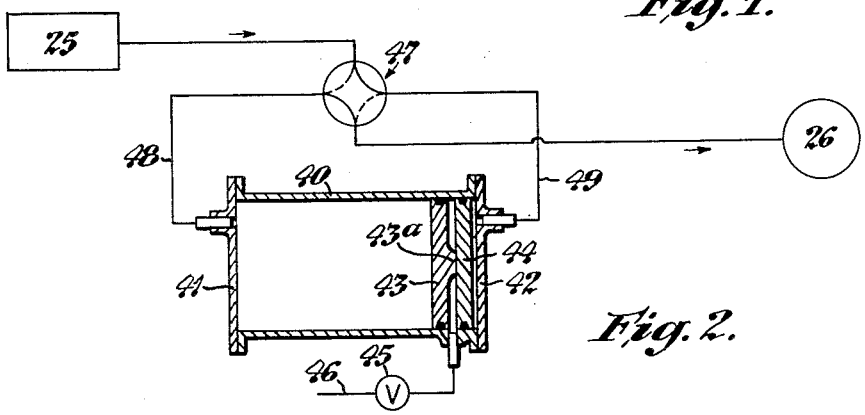
Fig. 2 is a similar view of a modified form of dispensing device in which a pair of pistons are employed as the movable septum means, said pistons being spaced apart by a quantity of liquid interposed therebetween and including means for adjusting the quantity of the liquid between the pistons to vary the amount of liquid dispensed.

Fig. 2 illustrates a modified liquid-dispensing device having a cylinder 40 provided with end walls 41 and 42 and a pair of pistons 43 and 44 slidable axially in the cylinder. The pistons 43 and 44 are adapted to be spaced apart by a volume of liquid interposed therebetween, the liquid being injected or removed by means of a reversible valve 45 and line 46 when the pistons are located as shown in Fig. 2. The opposite end walls 41 and 42 are connected to a selector valve 47 by lines 48 and 49, respectively, so that when liquid is introduced alternately into the ends of the cylinder 40 the pistons 43 and 44 will be moved axially as a unit to expel liquid alternately from each end of the cylinder. To vary the displacement of liquid, the amount of liquid interposed between the pistons is varied by manipulating the valve 45.

In the structure illustrated in Fig. 2, it is necessary that the pistons 42 and 43 be located at one end of the cylinder 40 in order to inject the adjusting liquid between the pistons.

Figure 3:
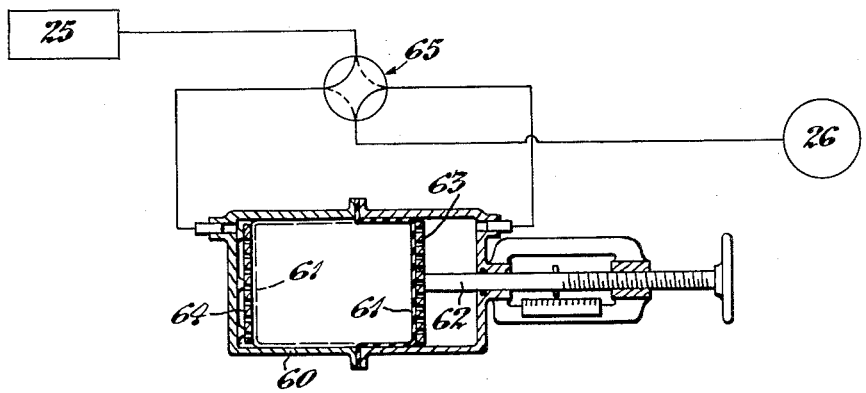
Fig. 3 is a similar view of another modified type of dispensing device, employing a flexible member as the movable septum means.

The modified form of device shown in Fig. 3 employs a closed cylinder 60 in which a resilient septum member 61 is adapted to flex and elongate. Liquid introduced alternately into the ends of the cylinder 60 will act upon the member 61 to flex it longitudinally, as indicated by the full and dotted line positions in Fig. 3, to discharge liquid in measured quantities alternately from opposite ends of the cylinder. The displacement of the stroke of the member 61 may be varied by an adjusting member 62, which is similar to the member 20 previously described in connection with the device shown in Fig. 1, but is provided with a plate 63 against which the member 61 is adapted to stop. Thus by adjusting the member 62 axially, the extent of flexing movement of the flexible member 61 may be varied. A baffle plate 64 may be provided adjacent one end wall of the cylinder to prevent the flexible member 61 from sealing off or entering the port in this end of the cylinder. The plates 63 and 64 may be spaced at their peripheries from the walls of the cylinder 60, and they may be also perforated, as shown. A selector valve 65 may be used for alternately directing the flow of liquid to opposite ends of the cylinder.

Fig. 4 illustrates another modified form of dispensing device employing a closed receptacle 70 in which is a pair of diaphragms 71 and 72. The rims of the diaphragms are fixedly secured in the periphery of the receptacle so that liquid introduced into the ends of the receptacle through lines 73 and 74 will cause the diaphragms to flex alternately in opposite directions to alternately discharge liquid from the opposite ends of the receptacle, the flow of liquid being controlled by a selector valve 75. Liquid is positioned between the two diaphragms 71 and 72 and the volume of this liquid is varied to alter the displacement of the liquid from the receptacle 70. The increase and decrease of the liquid between the diaphragms is controlled by an auxiliary valve 76, which may be turned one way to introduce liquid therein by way of line 77, and in another direction to connect the line 77 to a vent 78 to discharge liquid therefrom. The line 77 and the vent 78 may be controlled by valve V.

Fig. 5 shows a further modified type of liquid-dispensing device wherein a pair of diaphragms 80 and 81 are arranged in a receptacle 82 and adapted to be flexed in opposite directions to discharge liquid alternately through lines 83 and 84. One line 83 is connected to one end of the receptacle 82, while the other line 84 enters the receptacle between the diaphragms 80 and 81. Liquid is positioned between the diaphragm 81 and the right-hand end wall of the receptacle 82 to serve as a stop to limit the flexing movement of the diaphragms in a right-hand direction, thus controlling the displacement of liquid from the device. The volume of liquid in the right-hand end of the receptacle may be controlled by a line 86 and reversible valve 87. A selector valve 88 may be employed for directing the flow of liquid into and from the device. When liquid is introduced into the space between the diaphragms 80 and 81, the diaphragm 80 will be flexed toward the left to force liquid out of the left-hand end of the receptacle through the line 83. When the flow is reversed and liquid enters the left-hand end of the receptacle, the diaphragm 80 will be flexed toward the right to expel liquid from between the diaphragms, by way of line 84, the displacement of liquid alternately through the lines 83 and 84 being varied by changing the volume of liquid in the right-hand end of the receptacle.

Fig. 6 illustrates a still further modified form of device in which diaphragms 90 and 91 are adapted to engage against the opposite conical ends 92 and 93 of a receptacle 94. With this form of device, a relatively great displacement of liquid can be obtained with a relatively small flexing of the diaphragms. As shown in this view, lines 95 and 96 are connected to the opposite sides of the receptacle and the flow of liquid into and out of the opposite sides or chambers is controlled by a selector valve 97. A volume of liquid may be interposed between the two diaphragms 90 and 91 to adjust the displacement of liquid from the side of the receptacle, and the displacement may be altered by manipulating a valve 98 in a line 99 connected between the two diaphragms. This form of receptacle and arrangement of diaphragms may also be used in the device illustrated in Fig. 5.

Fig. 7 illustrates a simple metering device, within the spirit of this invention, which may be readily disassembled and cleaned, therefore providing a device which is particularly sanitary. In this construction, the cylinder 101 is supported in a bed 102 which is shaped as a C-clamp. Within the cylinder are adjustably fitted heads 103 and 104, these being retained in position by the anvil portion 102ª of the clamp and adjusting screw 105, which screw is similar to screw 20 in Fig. 1. Within the cylinder is loosely and reciprocally mounted a piston 106, which is moved as in the structure described in Fig. 1. The lines or conduits 28 and 29, and the selector valve 30 are similar to that shown in Fig. 1.

It will be observed from the foregoing, that my invention provides a particularly simple, yet highly efficient, device for dispensing liquid in measured quantities. The device may be applied to use with various machines or apparatus, such as concrete mixers, bottling machines, and the like, in which accurate measurement of liquids is of importance. The device has been herein shown as employing various types of pistons, diaphragms, and other flexible or movable septum means, for dividing the receptacles into chambers and expelling liquid alternately from said chambers in measured quantities. The means for varying the displacement of liquid from the receptacles is extremely simple and accurate in operation.

While I have herein shown and described the liquid metering and dispensing device as embodied in several preferred forms of construction, it is to be understood that other modifications may be made in the construction thereof, and in its application to use, without departing from the spirit or scope of the invention. Therefore, without limiting myself in this respect, I claim:

1. A device for dispensing liquid in measured quantities, comprising: a receptacle; a flexible septum means movably mounted in said receptacle for dividing said receptacle into two chambers, each of said chambers being provided with a port; a selector valve operative to alternately connect one of said ports to a supply of liquid and the other of said ports to a point of delivery whereby to effect relative movement between said receptacle and said septum means in opposite directions to deliver liquid alternately from each of said chambers; and hydraulic means for adjusting the extent of relative movement between said receptacle and said septum means in all positions of the latter to vary the amount of liquid delivered from said ports.

2. A device for dispensing liquid in measured quantities, comprising: a receptacle; a pair of flexible septum means in said receptacle and together dividing said receptacle into two chambers, said flexible septum means being held in spaced relation by liquid interposed therebetween; ports communicating with each of said chambers; valve means adapted to alternately introduce liquid through each of said ports to alternately flex the pair of flexible septum means in opposite directions to discharge liquid alternately from each of said ports; and means for varying at all times the amount of liquid interposed between said flexible septum means to vary the amount of liquid introduced into and discharged from each of said ports.

3. A device for dispensing liquid in measured quantities, comprising: a receptacle having outwardly extending relatively flat conical heads at its opposite ends, a pair of flexible septum means in said receptacle mounted at their peripheral portions adjacent each other and at the base of the conical heads, said pair of flexible septum means together dividing said receptacle into two chambers, said flexible septum means being held in spaced relation by liquid interposed therebetween, ports communicating with each of said chambers, valve means adapted to alternately introduce liquid through each of said ports to alternately flex the pair of flexible septum means in opposite directions to discharge liquid alternately from each of said ports, and means for varying at all times the amount of liquid interposed between said flexible septum means to vary the amount of liquid introduced into and discharged from each of said ports.

4. A device for dispensing liquid in measured quantities, comprising: a receptacle having end walls; flexible septum means in said receptacle, flexible toward and away from each of said end walls and dividing said receptacle into two chambers, each chamber having a port; a selector valve operative alternately to connect one of said ports to a supply of liquid and the other of said ports to a point of delivery whereby to effect relative movement of the septum means in opposite directions to deliver liquid alternately from each of said chambers; and hydraulic adjusting means acting against said septum means at all times, regardless of the flexed condition thereof for limiting the maximum flexing thereof so as to vary the displacement of liquid from said chambers.

AUSTIN U. BRYANT.

REFERENCES CITED

The following references are of record in the file of this patent:

UNITED STATES PATENTS

| Number | Name | Date |
| --- | --- | --- |
| 1,736,359 | Pferdmenges | Nov. 19, 1929 |
| 1,777,293 | Curtis et al. | Oct. 7, 1930 |
| 2,062,181 | Klaus | Nov. 24, 1936 |
| 2,120,412 | Kucki | June 14, 1938 |